Sept. 19, 1961 A. F. HASBROOK 3,000,460
SONIC GEOPHYSICAL EXPLORATION
Filed Feb. 5, 1958 2 Sheets-Sheet 1
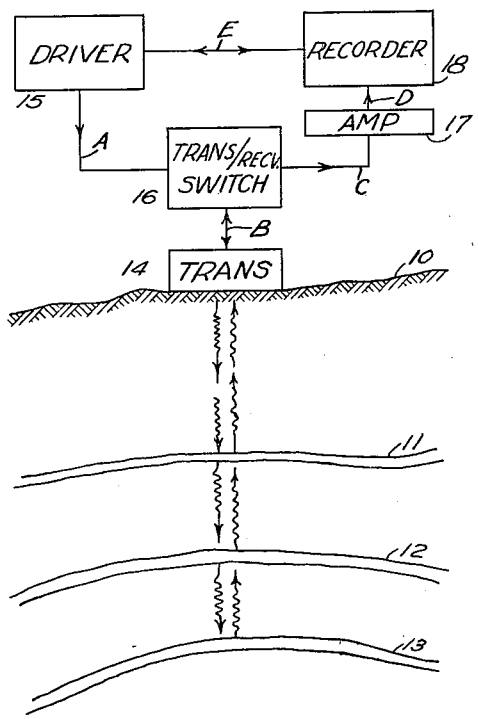
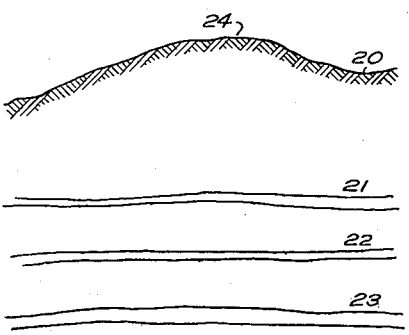
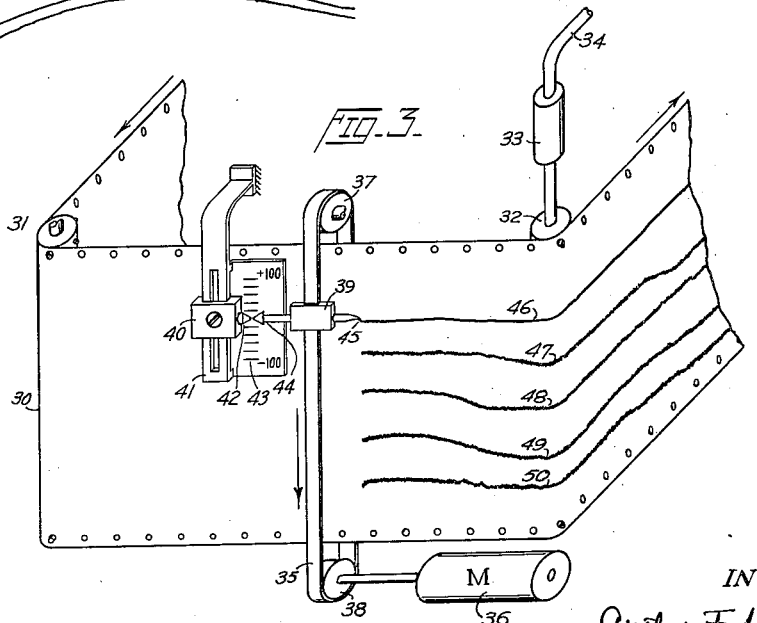
INVENTOR
Arthur F. Hasbrook INVENTOR
Arthur F. Hasbrook … # 3,000,460
SONIC GEOPHYSICAL EXPLORATION
Arthur F. Hasbrook, Bexar County, Tex., assignor to Olive S. Petty, San Antonio, Tex.
Filed Feb. 5, 1958, Ser. No. 713,499
5 Claims. (Cl. 181—.5)

This invention relates to sonic geophysical prospecting and especially to improvements in the recording of sonic signals which have traveled through the sub-surface of the earth. More particularly the invention is concerned with providing corrections for changes in surface elevations simultaneously with the recording of the sonic signals.

In one type of sonic exploration for sub-surface geological features which may be associated with deposits of valuable minerals or petroleum, the procedure is to impress a series of sonic impulses on the surface or near-surface of the earth and to intercept, detect and record the resulting delayed signals which have traveled over various paths through the sub-surface. When the operating parameters are selected properly and satisfactory sub-surface conditions exist, it is possible to identify on the recording numerous signals representing sonic energy reflected from the interfaces of strata within the earth.

The type of recorder usually employed in sonic geophysical exploration is intended to provide directly a simulated geological cross section of the earth over which the recording apparatus has been transported and operated. For example, the horizontal coordinate of the recording medium usually represents the horizontal position on the surface of the earth and the vertical coordinate represents depth to the reflecting interfaces within the earth. A marker pen or stylus is moved repetitively along the vertical axis of the recording medium, in synchronism with the sonic impulses impressed on the earth's surface, and at a speed which is related to the known or assumed velocity of the sonic signals, so as to convert signal travel-times directly into depth indications. Whenever the pen or stylus is actuated by an electrical signal corresponding to a sonic signal, the recording medium is marked in some manner suitable to the particular recording method. As the exploration equipment is transported across the surface of the earth, the recording medium is moved in a horizontal plane, perpendicular to the motion of the marker stylus, so as to make the horizontal coordinate representative of the actual position on the surface. In the resulting recording, signal markings or deflections along the vertical coordinate simulate the actual reflecting interfaces which are the cause of the reflected sonic signals.

If the surface of the earth is constant in elevation, the sonic recording represents a true cross section of the earth, provided the correct velocity is employed. On the other hand, if the surface elevation varies considerably, the travel-times of the sonic signals are changed so as to distort the sub-surface representation unless suitable corrections are made. In the prior art it has been common to apply such elevation corrections subsequent to the actual field recordings, either in computation or in a re-recording process. In the present invention, however, the elevation correction is applied directly to the field recording at the time of the recording process so that the recording is immediately representative of the true geological cross section.

It is the principal object of the present invention to provide method and means whereby corrections may be applied to sonic exploration recordings for variations in the elevation of the earth's surface. A further object of the invention is to furnish a method and means of applying elevation corrections to a sonic exploration reocrding simultaneously with or prior to the actual recording process. A still further object is to furnish means whereby elevation corrections are applied automatically as the recording apparatus is transported over the earth.

The foregoing and other objects and features of the invention will be better understood from the following description and the accompanying drawings, in which FIGURE 1 represents a cross section of the earth in conjunction with a block diagram illustrating the typical arrangement for sonic geophysical prospecting;

FIGURE 2 represents a cross section of the earth illustrating the problem with which the present invention is concerned;

FIGURE 3 is an illustrative drawing of a recorder to which an elevation correcting means has been applied;

Figure 4:
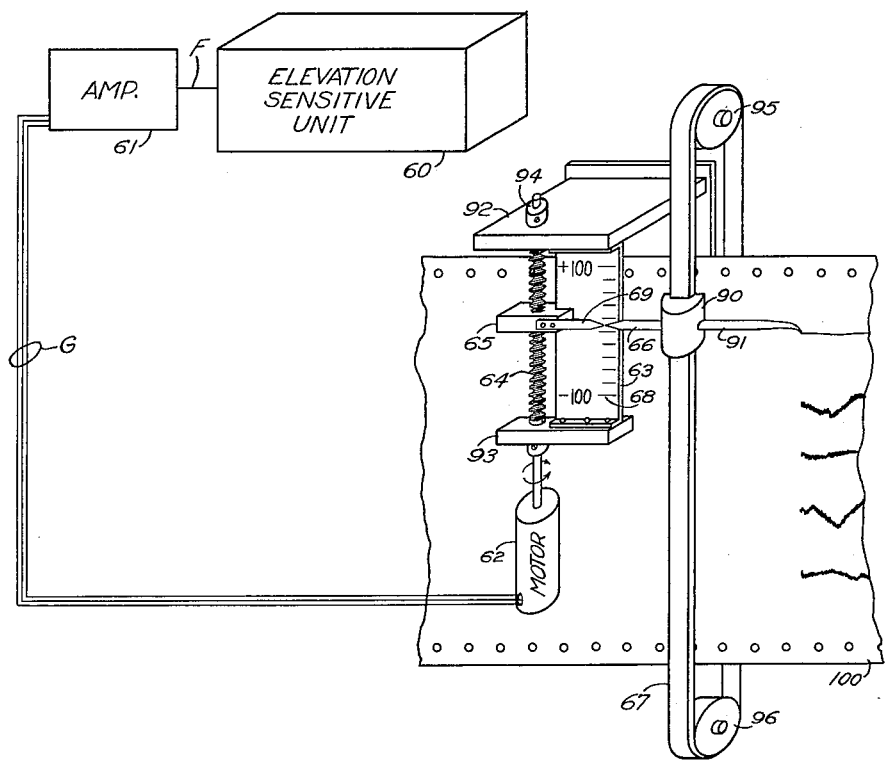
FIGURE 4 illustrates an arrangement for automatically actuating the elevation correction means as the recording equipment is transported over the surface.

Referring now to FIGURE 1 of the drawings, a cross section of the earth is shown diagrammatically with surface 10 and several subsurface interfaces 11, 12 and 13. In a typical arrangement for sub-surface exploration, the sonic equipment, comprised by transducer 14, driver unit 15, transmit-receive switch 16, amplifier 17 and recorder 18, is set up on surface 10 and operated so as to direct signals toward and receive reflections from the interfaces 11, 12 and 13. Transducer 14 which may be any of the well-known types such as magneto-striction or piezo-electric, serves both as a transmitter and receiver of sonic impulses or signals. The driver unit 15 is a source of high power electrical impulses of the proper rate and duration; such sources are well-known in the electronic art. In order to protect amplifier 17 from damage by the high power impulses impressed on transducer 14 by driver unit 15, a transmit-receive switch 16 is provided. When the pulse rate of the system is low and rapid responses are not required, a high-speed relay is satisfactory for use as a transmit-receive switch 16. Usually the use of transmit-receive tubes, well-known in radar circuits, will be desirable to permit operation over a wide range of pulse rates and durations. During the transmission period, the output of driver 15 is connected via cable A, transmit-receive switch 16, cable B to transducer 14, but not to amplifier 17. At the termination of the transmission period, switch 16 connects the output of transducer 14 through cable C to amplifier 17 and provides isolation from driver 15 so as to prevent loss of signal. Amplifier 17 serves to amplify the relatively weak signal output from transducer 14 to a level suitable for recording. Recorder 18 is connected to the signal output of amplifier 17 through cable D so as to produce a permanent recording which simulates the actual geological cross section of the sub-surface through which the sonic signals have traveled.

Operation and functioning of the sonic exploration arrangement shown in FIGURE 1 may be described briefly as follows: Electrical impulse energy from driver unit 15 is applied via transmit-receive switch 16 to the sonic transducer 14 so as to impress sonic impulses on the surface 10 of the earth. The pulse-forming circuits in driver 15 are synchronized with the recorder 18 through cable E so that the onset of each impulse corresponds to the zero or surface indication on the recording medium. Sonic impulses from sonic transducer 14 travel through the sub-surface of the earth as sonic signals and are partially reflected at the interfaces of the several sub-surface beds 11, 12 and 13. These reflected signals are directed back toward the surface 10 and intercepted by transducer 14. Electrical signals from the output of transducer 14 are applied via transmit-receive switch 16, which is in the receiving position, to amplifier 17 and thence to the recording mechanism of recorder 18. As stated previously, recorder 18 is preferably a type that will furnish a permanent recording in which the electrical signals representing sonic signals, the motion of the recording medium and the repetitive movement of the marker pen or stylus combine to simulate an actual cross section of the earth's sub-surface.

In order to produce the desired representation of the earth's sub-surface on the recording, it is necessary to record either continuously or at relatively close intervals as the sonic equipment is transported across the surface. If the elevation of the surface does not change, the sonic recording is truly representative of the sub-surface, provided the correct velocity is employed. Under actual field conditions, however, the elevation almost always varies considerably so that the travel-times of the sonic signals are changed in such a manner as to distort the sub-surface representation unless suitable corrections are made. This elevation problem is illustrated in FIGURE 2 wherein a cross section of the earth is shown with surface 20 in the form of a varying elevation whereas the sub-surface strata 21, 22 and 23 are relatively flat. If sonic reflection recordings are made across surface 20, without correction for the changes in elevation, the resulting representation will show a synclinal structure in strata 21, 22 and 23 due to the increased travel-times from the top of the hill 24 to the sub-surface strata. Conversely, if the surface 20 formed a valley, then the sonic recording representing the sub-surface would indicate a false anticlinal condition in strata 21, 22 and 23. In the prior art corrections for changes in elevation have been made, subsequent to the actual field recording, either by measurements and computation or by re-recording the sonic information. In the present invention elevation corrections are applied either simultaneously or just in advance of the recording process so that the corrected representation of the earth's sub-surface is immediately available for visual inspection and utilization.

Referring now to FIGURE 3 of the drawings, an arrangement is shown for applying elevation corrections directly to a recorder used in sonic geophysical prospecting. As described previously, the recorder is a type suited to direct simulation of an actual cross section of the earth's sub-surface. Recording medium 30 preferably is of the electro-conducting type which is most suitable to high speed recording. Sprocketed rollers 31 and 32 provide for transport of recording medium 30 in a horizontal direction to simulate change in horizontal position on the surface of the earth. To effect motion of the recording medium 30, sprocketed roller 32 is driven via a coupling gear box 33 by a flexible shaft 34 which may be connected to a wheel or drive shaft of the transporting vehicle. Thus the rate at which medium 30 is moved is determined directly by the movement of the recording equipment over the surface; under this condition, a horizontal scale may be applied to recording medium 30 as an indication of horizontal position on the surface. A flexible band 35 is mounted so as to be moved vertically, or perpendicular to the motion of recording medium 30, on support rollers 37 and 38. Support roller 38 is driven by a motor 36 so as to move flexible band 35 at a constant speed. A contact assembly, comprised by mounting block 39, moving electrical contact 44 and recording stylus 45, is secured to the flexible band 35 so as to be carried across recording medium 30 in a vertical direction. The speed with which moving electrical contact 44 and recording stylus 45 are moved across medium 30 is chosen, on the basis of sonic velocity and normal sonic travel-times, so that the vertical coordinates of medium 30 represent depth below the surface. For example, if the maximum depth desired is 2000 feet and the sonic velocity in earth is 8000 feet per second, then the moving electrical contact 44 and recording stylus 45 must move across the width of medium 30 in one-half second. Adjacent to flexible band 35, and its associated contact and stylus assembly comprised by mounting block 39, moving electrical contact 44 and recording stylus 45, there is mounted an adjustable contact assembly comprised by adjustment arm 40, slotted mounting bracket 41, adjustable electrical contact 42 and scale 43. The purpose of moving electrical contact 44 and adjustable electrical contact 42 is to make contact, once during each rotation of flexible band 35, so as to effect triggering of the driver unit 15 shown in FIGURE 1, and resultant transmission of a sonic impulse by transducer 14. If adjustable contact 42 is set, by moving an adjustment arm 40, to a fixed position corresponding, for example, to the zero line on scale 43, then the transmitted sonic impulse will always be triggered at the same vertical coordinate on recording medium 30. Under this condition, there will be no correction for any variations in elevation of the surface and the travel-times will be so changed as to distort the simulated sub-surface cross section as displayed on the recording medium 30. In order to achieve the objects of the present invention, the adjustable electrical contact 42 may be moved up or down to correct for elevation changes. Suppose, for example, that the adjustable contact 42 is set to the zero line on scale 43 at some location of average or datum elevation along a prospect line. At this location, then, the contacting of moving electrical contact 44 and adjustable electrical contact 42 will trigger the driver circuit 15, in FIGURE 1, and result in transmission of the sonic impulse by transducer 14. Thus, the contact instant will occur at the zero or surface coordinate on the recording medium 30. Now suppose the sonic equipment is moved to a new location where the elevation is higher. The new elevation will be known from altimeter readings or engineering survey notes. Since the new elevation is higher, the traveltime of the sonic signals will be greater and adjustable electrical contact 42 must be moved upward the correct distance on scale 43 so as to make the contacting, of moving electrical contact 44 and adjustable electrical contact 42, occur higher with respect to the vertical coordinates of recording medium 30. This change in trigger instant effected by moving adjustable contact 42, and the resultant change in the instant of sonic impulse transmission, can be made to cancel exactly the effects of elevation change on the sonic travel-time. Thus as the prospecting progresses across the earth's surface, the operator moves the adjustable contact 42 as frequently as necessary to the proper value on scale 43 to correct for variations in elevation. The resulting sub-surface representation on recording medium 30 will be corrected for elevation changes so that no distortion occurs in the signal tracings 47, 48, 49 and 50 for the deeper strata. The surface tracing 46 will be distorted, of course, in accordance with the elevation correction due to displacement of adjustable electrical contact 42; however, this surface tracing 46 is of little interest and may be suppressed, if desired, by electrical or mechanical means.

While the invention as described above is quite satisfactory for applying elevation corrections when the recording locations are spaced somewhat apart on the surface of the earth, an automatic correction arrangement is preferable when the recording process is continuous. In FIGURE 4 of the drawing, there is shown an arrangement for automatically correcting the recording as the recording apparatus is transported across the surface. Elevation sensitive unit 60 is so constructed as to produce electrical correction signal output corresponding to changes in elevation. For example, the elevation sensitive unit 60 may be actuated by barometric pressure variations with change in elevation or by the output from integrating type systems in which the actual mathematical curve of the surface is determined and the vertical component, or elevation, is computed immediately. Whatever the actuating arrangement, the electrical correction signals from unit 60 are fed through cable F and are increased in amplitude and power by amplifier 61 so as to provide for actuation of motor 62 through cable G. Motor 62 turns a threaded shaft 64 on which is mounted adjustment block 65 and thereon adjustable electrical contact 69. Threaded shaft 64 rotates in bearings 92 and 93 which are fixed to mounting bracket 63. Axial motion of shaft 64 is prevented by a restraining collar 94 outside of bearing 92 and a similar collar, not shown, outside bearing 93. Adjustment block 65 is threaded onto threaded shaft 64 and prevented from rotation on shaft 64 by sliding engagement with mounting bracket 63. Thus when the motor 62 rotates threaded shaft 64, the adjustment block 65 slides up or down on mounting bracket 63. Adjustable electrical contact 69 is mounted in fixed position on adjustment block 65 so as to be moved upward or downward, by motor 62, with respect to scale 68. A moving electrical contact 66 is mounted so as to contact adjustable electrical contact 69 repetitively at the pulse repetition rate for the system. Moving electrical contact 66 is affixed to a mounting block 90 which in turn is fastened to flexible band 67 for transport past the adjustable electrical contact 69 and vertically across the recording medium 100. Recording stylus 91 also is fastened to the mounting block 90 for use in impressing the electrical signals on the recording medium 100. Functioning of the apparatus shown in FIGURE 4 may be described briefly as follows. The initial or zero position of adjustable electrical contact 69, as determined at some selected location on the surface of the earth, represents the elevation datum or reference for the recording to be made. By suitable adjustment of a zeroing control in the elevation sensitive unit 60, the contact 69 is made to assume the zero position as indicated on scale 68. As the recording equipment is moved over the surface, the elevation sensitive unit 60 responds to elevation changes and furnishes electrical correction signals to amplifier 61. Amplified signals from amplifier 61 are applied to motor 62 so as to move effectively the adjustable electrical contact 69 in accordance with the elevation changes which actuate elevation sensitive unit 60. As a result, the vertical position of adjustable electrical contact 69 is changed so as to make contact with moving electrical contact 66 either earlier or later, as viewed on scale 68. Accordingly, the instant of the transmitted sonic impulse, as determined by closure of contacts 66 and 69, is shifted wtih respect to the recording medium 100 on which marker stylus 91 impresses signals. Thus the instant of impulse transmission is effectively shifted to correct for changes in elevation. This correction is applied continuously and automatically to the sonic recording as the apparatus is transported across the surface, so that the final result is a simulated cross section of the earth which is not distorted by travel-time variations due to elevation change.

Figure 5:
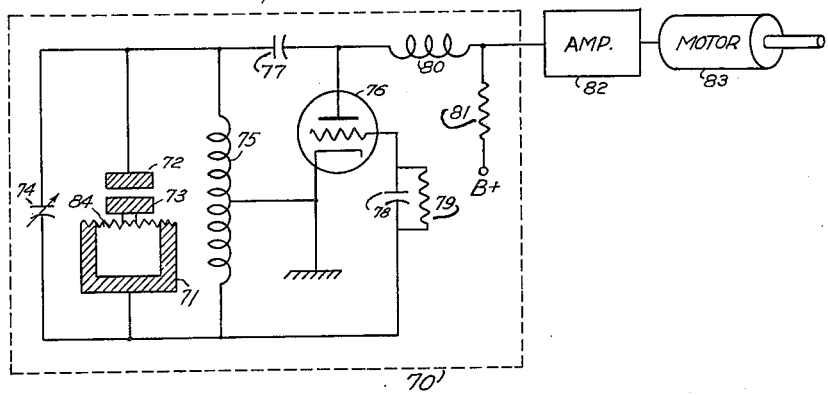
FIGURE 5 is a circuit diagram illustrating one possible arrangement of certain units shown more generally in FIGURE 4.

In FIGURE 5 of the drawing, there is shown one suitable arrangement of circuitry for the more general elevation sensitive unit 60 of FIGURE 4. The elevation sensitive circuit 70, shown in the dotted enclosure, furnishes electrical correction signals which are applied to an amplifier 82 and thence to a motor 83 for actuation of the corrective mechanism in the recorder. Elevation sensitive circuit 70 is essentially an oscillator circuit in which barometric pressure changes are converted to electrical output. A pressure responsive capacitor is formed by fixed capacitor plate 72 and moving capacitor plate 73 which is actuated by the difference in pressure between the interior of sealed capsule 71 and the outside atmosphere via flexible diaphragm 84. As the atmospheric pressure varies, in response to elevation changes, the distance between fixed capacitor plate 72 and moving capacitor plate 73 varies so as to increase or decrease the effective capacity. The variable capacity of plates 72 and 73 is applied across an inductance 75 to form an oscillatory circuit when used in conjunction with vacuum tube 76 and the associated components. A small variable capacitor 74 is connected across the inductance 75 to permit zero adjustment. Capacitor 77 offers low impedance to alternating-current oscillation signals, but prevents direct current conduction. Resistor 79 and capacitor 78 have suitable values to provide grid-leak biasing of tube 76. Direct current flows to the plate or anode of tube 76 via a radio-frequency choke 80 and a load resistor 81. The elevation sensitive circuit functions in the following manner. The circuit is oscillating normally at a frequency determined chiefly by inductance 75, variable capacitor 74 and the pressure-responsive capacitor formed by plates 72 and 73. Current flows in the anode circuit of tube 76 through radio-frequency choke 80 so as to create a voltage drop across load resistor 81. Since the impedance of the oscillating circuit varies with frequency, thereby changing the anode current in tube 76, changes in the pressure-responsive capacitor formed by plates 72 and 73 will result in changes in the voltage drop across load resistor 81. These electrical voltage changes may be used as electrical correction signals, after suitable amplification by amplifier 82, to drive motor 83 and effect correction of the recording.

While the invention has been described in terms of the foregoing specific details and embodiments thereof, these are by way of illustration only and it will be obvious to those skilled in the art that various changes and modifications may be effected without departing from the invention.

Having thus described the invention, I claim:

1. Apparatus for use in sonic geophysical exploration comprising a recording medium, recording stylus means for repetitively traversing said recording medium, a source of electrical impulses, circuit controlling means electrically connected with said source and operable by movement of said stylus means for activating said source to initiate said impulses, adjustment means operatively associated with said circuit controlling means to advance or retard in time the initiation of impulses from said source, a sonic transducer electrically connected with said source for converting said electrical impulses into sonic impulses and impressing the latter on the surface of the earth, an elevation-sensitive means, means operatively associated with said elevation-sensitive means for supplying to said adjustment means electrical correction signal representative of elevation changes to control the time of initiation of said impulses, whereby delay in arrival time of reflected sonic impulses resulting from changes in elevation of said apparatus is compensated.

2. Apparatus for use in sonic geophysical exploration comprising a recording medium, recording stylus means for repetitively traversing said recording medium, a source of electrical impulses, circuit controlling means electrically connected with said source and operable in timed relation with the movement of said stylus means for activating said source to initiate said impulses, elevation-sensitive adjustment means operatively associated with said circuit controlling means to advance or retard in time relative to the position of said stylus means the initiation of impulses from said source in conformity with change in elevation of said apparatus, and a sonic transducer electrically connected with said source for converting said electrical impulses into sonic impulses and impressing the latter on the surface of the earth, whereby delay in arrival time of reflected sonic impulses resulting from changes in elevation of said apparatus is compensated.

3. Apparatus for use in sonic geophysical exploration comprising a recording medium, recording stylus means for repetitively traversing said recording medium to provide on said medium a datum line, a source of electrical impulses, circuit controlling means electrically connected with said source and operable by movement of said stylus for activating said source to initiate said impulses, elevation-sensitive adjustment means operatively associated with said circuit controlling means to advance or retard in time the initiation of impulses from said source in conformity with changes in elevation of said apparatus, and a sonic transducer electrically connected with said source for converting said electrical impulses into sonic impulses and impressing the latter on the surface of the earth and for receiving and converting into recordable electrical signals reflected sonic signals, whereby delay in arrival time of reflected sonic impulses resulting from change in elevation of said apparatus is compensated.

4. Apparatus as in claim 2 wherein the elevation-sensitive adjustment means comprises an oscillation circuit in which the operating characteristics are varied by changes in barometric pressure resultant from variations in elevation.

5. Apparatus as in claim 1 wherein the elevation-sensitive means is comprised by an inductive-capacitive oscillation circuit in which the capacity is varied by changes in barometric pressure resultant from variations in elevation.

References Cited in the file of this patent

UNITED STATES PATENTS

| | | |
|---|---|---|
| 2,440,971 | Palmer | May 4, 1948 |
| 2,688,124 | Doty et al. | Aug. 31, 1954 |
| 2,767,389 | McCollum | Oct. 16, 1956 |
| 2,806,545 | Schempf | Sept. 17, 1957 |
| 2,827,619 | Fryklund | Mar. 18, 1958 |
| 2,841,777 | Blake et al. | July 1, 1958 |
| 2,846,288 | Fryklund | Aug. 5, 1958 |